United States Patent
Roe

[15] 3,679,017
[45] July 25, 1972

[54] SUSPENSION SYSTEM FOR VEHICLES
[72] Inventor: Leslie A. Roe, R.R. #5, Columbia City, Ind.
[22] Filed: Oct. 13, 1969
[21] Appl. No.: 865,610

[52] U.S. Cl.................180/73 TL, 180/79.2, 280/112 A, 280/124 A
[51] Int. Cl..........................................B60g 21/02
[58] Field of Search......................180/73, 73 TL, 73 TT, 72; 280/112.1, 124.3

[56] References Cited

UNITED STATES PATENTS

| | | | |
|---|---|---|---|
| 1,226,632 | 5/1917 | Bock et al. | 180/72 |
| 1,806,695 | 5/1931 | Masury | 180/72 |
| 1,822,159 | 9/1931 | Masury | 180/72 |
| 2,696,387 | 12/1954 | Nordin | 280/112 A X |
| 1,979,192 | 10/1934 | Burney | 280/112 A |
| 2,260,102 | 10/1941 | Freret | 280/112 A |
| 2,475,487 | 7/1949 | Ennis | 180/73 |

FOREIGN PATENTS OR APPLICATIONS

756,623 9/1933 France....................180/72

*Primary Examiner*—A. Harry Levy
*Attorney*—Jeffers and Young

[57] ABSTRACT

A linkage is pivotally connected to the frame of the vehicle and serves as a mounting for the vehicle wheel so that the vehicle wheel can pivot relatively to the frame in a vertical direction and the linkage is also journaled for movement on a horizontal axis causing pairs of interconnected wheels to be banked. Each wheel of the vehicle, whether power driven or steerable, can independently move vertically against a spring action for suspension of the vehicle and one or more pairs of such wheels are banked by turning movements on a respective horizontal axis. The banking of the wheel is in proportion to the steering of the vehicle. The front set or rear set, or both sets can be banked but in every event the pairs are banked in unison.

8 Claims, 8 Drawing Figures

Patented July 25, 1972

INVENTOR
LESLIE A. ROE
by JEFFERS & YOUNG
Attorneys

INVENTOR
LESLIE A. ROE
by JEFFERS & YOUNG
Attorneys

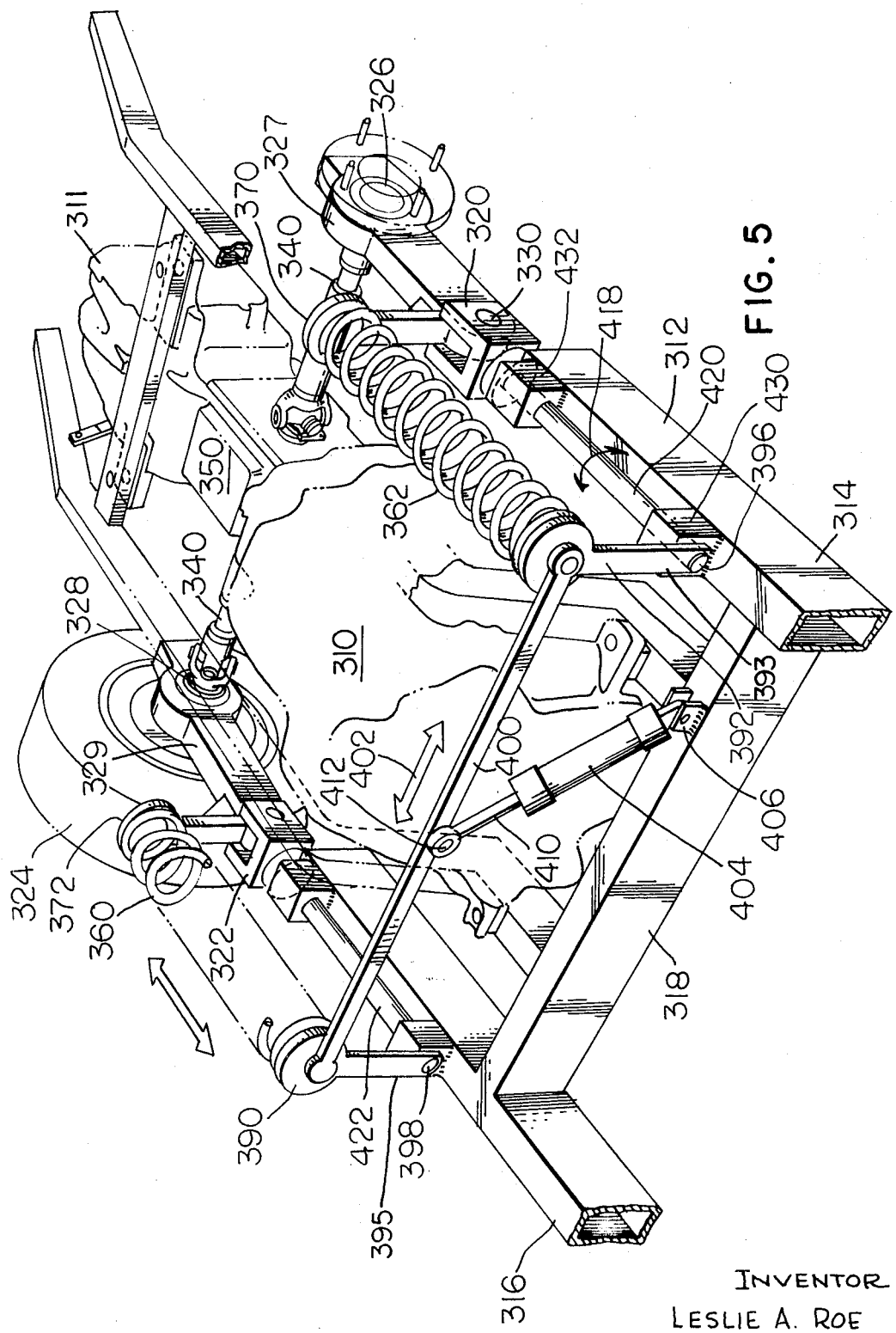

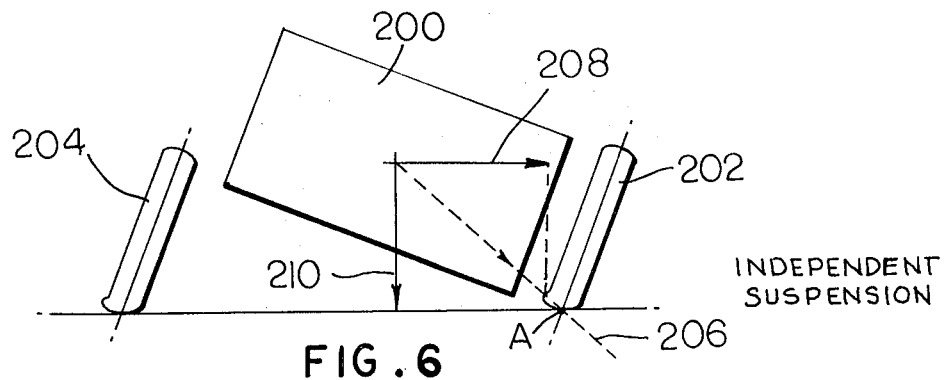
FIG. 6 — INDEPENDENT SUSPENSION
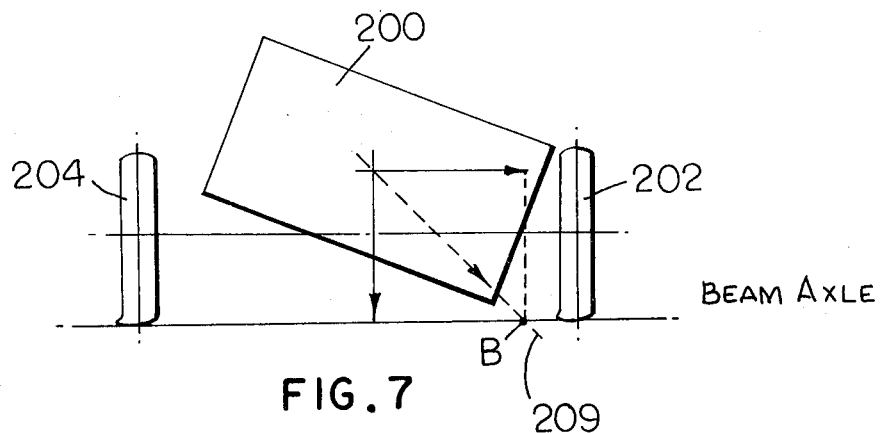
FIG. 7 — BEAM AXLE
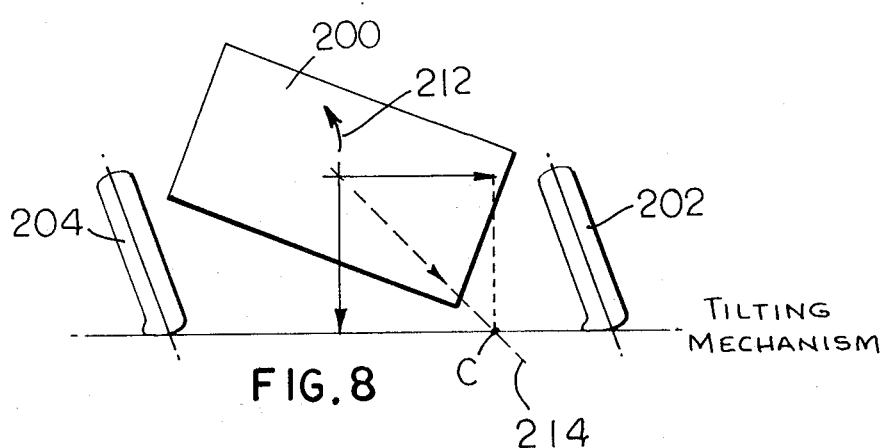
FIG. 8 — TILTING MECHANISM
INVENTOR
LESLIE A. ROE
by JEFFERS & YOUNG
Attorneys

SUSPENSION SYSTEM FOR VEHICLES

BACKGROUND OF THE INVENTION

When steering a vehicle around a corner there is a tendency for the vehicle wheels to slide because of inertia and this instability is furthered by the shift of the center of gravity of the vehicle outwardly along the radius of turning. The inertia must be overcome by the gripping action which exists between the tires and the ground, and should this gripping action be insufficient then the vehicle will tend to slide and stability therefore made more difficult and hence more hazardous. Consequently, the vehicle must either slow up as it turns to reduce the effect of centrifugal force, or the grade must be banked in order to obtain adequate stability of the vehicle during turning, or "cornering" as it is sometimes referred to.

The present invention proposes a different concept of stabilizing a vehicle in which the vehicle wheels are individually suspended and are banked in accordance with the degree of steering so that for sharp angles of steering the wheels will be deeply banked; for slight angles of steering the wheels will be correspondingly more shallowly banked. An important feature of the prior art vehicles is that rideability of the vehicle using individually suspended wheels could be achieved and stability achieved with a fixed or straight axle. But a combination of both stability and rideability has proved generally to be beyond the present knowledge of the art. The present invention seeks to answer this deficiency. The vehicle wheels in the present invention are individually suspended but are banked in pairs so that the vehicle is more stable both by reason of the bank of the wheel and also because of the shift in the center of gravity inwardly to stabilize the vehicle against uncontrollable swerving or sliding during the turning operation.

DETAILED DESCRIPTION OF THE DRAWINGS

FIG. 5 is an isometric view of the chassis, the power cylinder, responsive to the power steering system, and a suspension system in combination with the rear wheels and rear mounted engine, one of the rear wheels being shown detached;

FIG. 6 is a schematic view showing the chassis and ground supporting wheels which are independently suspended as illustrated in FIG. 3, but not banked in accordance with the present invention;

FIG. 7 illustrates the turning forces on the chassis but with the beam axle holding the wheels more rigidly upright; and FIG. 8 illustrates the turning forces with an independent suspension for each wheel and wheel tilting mechanism of the present invention. Each of FIGS. 6, 7 and 8 are viewed from the direction of the oncoming vehicle and assuming that the vehicle is being turned so that it goes to the viewer's left as the vehicle comes out of the plane of the paper.

DETAILED DESCRIPTION OF THE INVENTION

Figure 1:
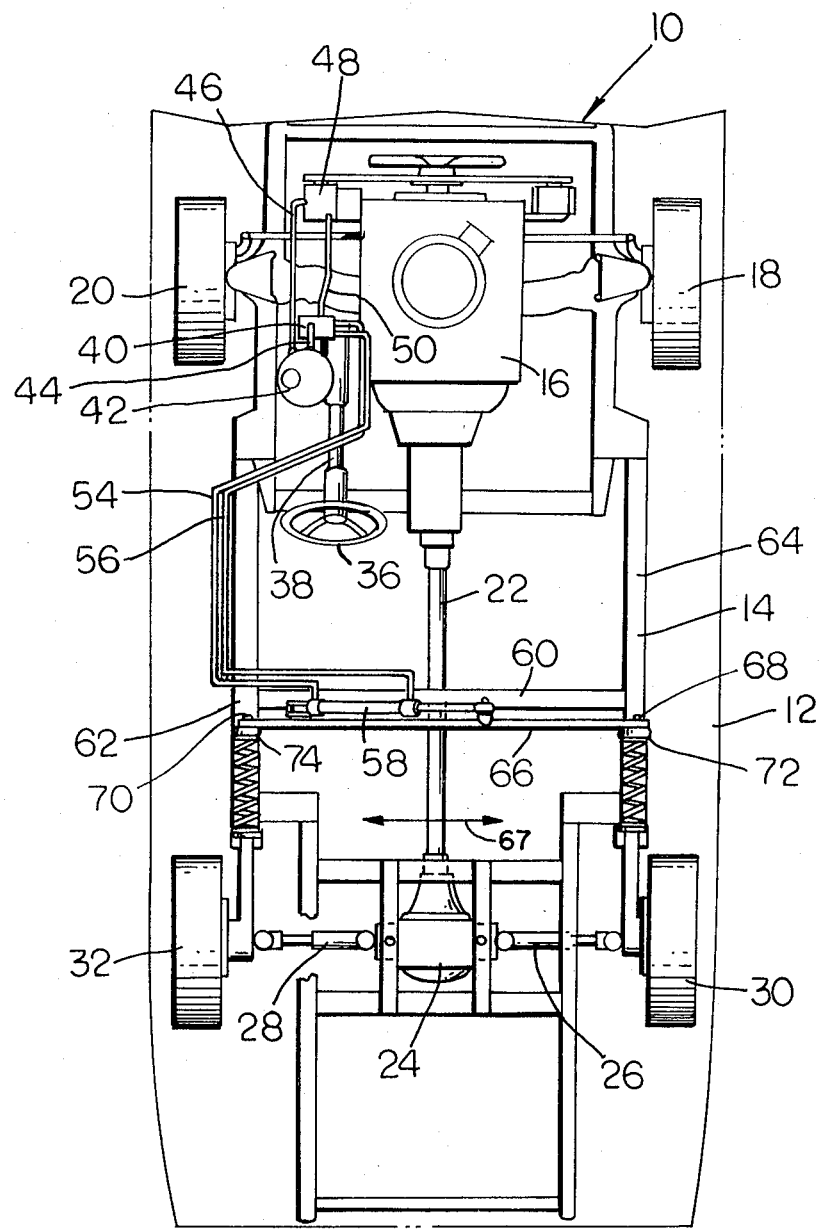
FIG. 1 is a plan view of a vehicle chassis and power steering system which is shown equiped with the present invention incorporated in the rear wheels of the vehicle.

Referring to FIG. 1, a vehicle designated generally by reference numeral 10 includes a chassis 12, having a frame 14, which serves to mount a motor 16 supported over the front wheels 18 and 20 and is connected through a power train including a transmission 22 differential 24 and axle drive shafts 26 and 28 to rear wheels 30, 32, The front wheels are the steerable wheels and are directed by means of a steering wheel 36 having a steering shaft 38 connected with a hydraulic valve 40 supplied by a hydraulic reservoir 42. A supply line 44 leads from reservoir 42 to valve 40 and a second line 46, connects the reservoir with the hydraulic pump 48 having a pressure line connection 50 to the hydraulic valve 40 with two outlet lines 54, 56 operatively connected to a power cylinder 58.

Figure 2:
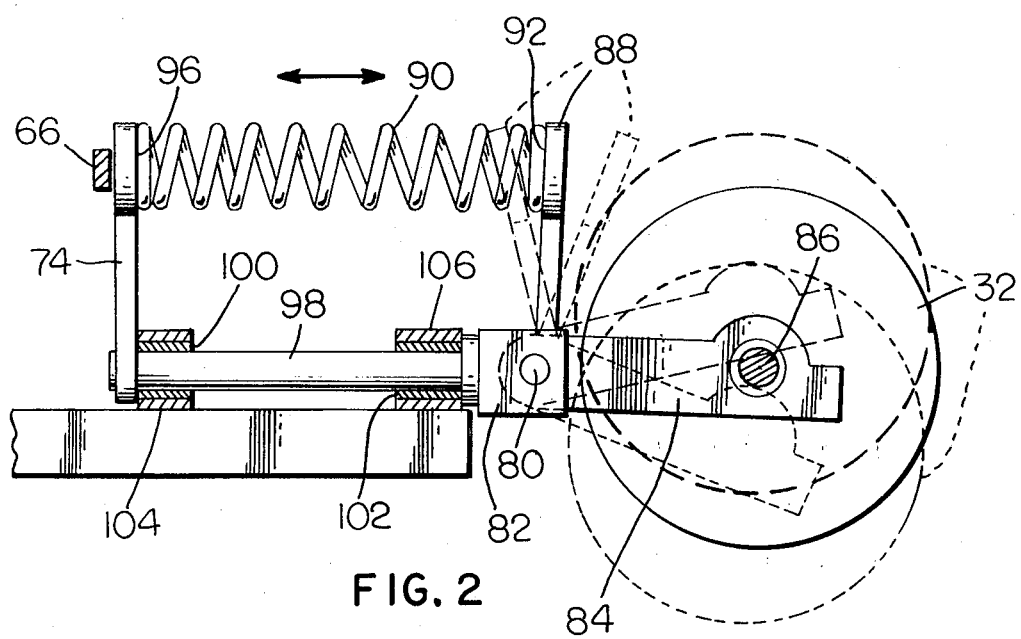
FIG. 2 is an enlarged detail view of one of the rear wheels that is mounted on the chassis of the vehicle, in full and dotted lines which respectively indicate the vertical movement of the wheel relatively to the chassis.

The power cylinder 58 is fixed at one end to a cross bar 60 which is fastened between side rails 62, 64 of the frame and is connected at the other end to a stabilizing link 66, moveable in the direction of double arrow headed line 67 and having pivotal connections 68 and 70 at the opposite respective ends with crank arms 72, 74 one of the crank arms 74 being illustrated in side view in FIG. 2.

Referring to FIG. 2, wheel 32 is free to move vertically on a pivot pin mounting 80 which is received within a U-joint 82. The wheel is mounted on one arm 84 having an axle 86 for the wheel and the second arm 88 is formed transversely to arm 84 with a spring 90 compressed between end 92 of arm 88 and end 96 of lever 74 so that resistance to vertically upward movement of wheel 32 is generated by spring 90 which serves to restore the wheel to its original position each time there is a vertical displacement caused by road shock or the like.

Figure 3:
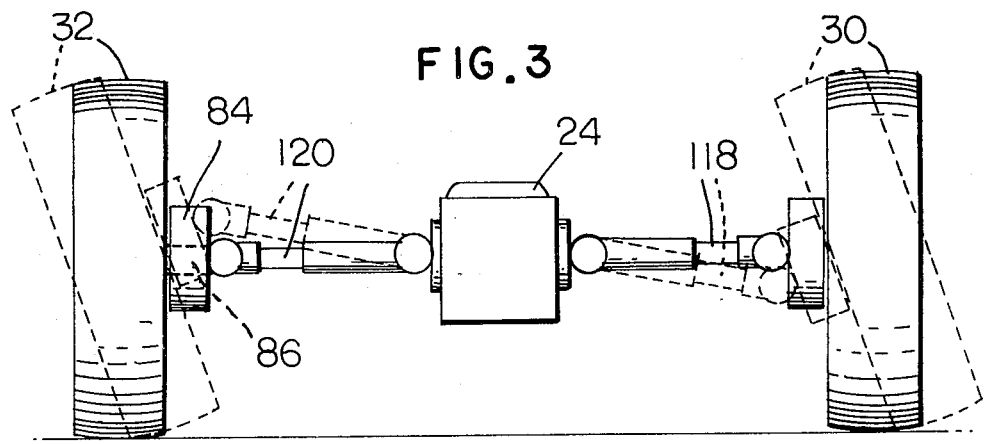
FIG. 3 is a rear elevation view of the rear wheels of the vehicle illustrating how the wheels are banked in accordance with the present invention.
Figure 4:
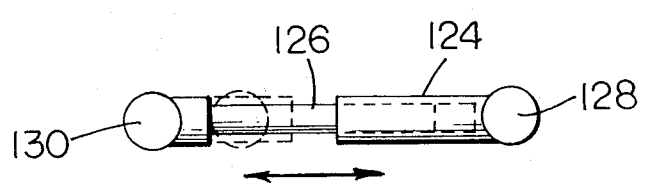
FIG. 4 illustrates the telescoping action of the power take-off shafts from the drive shaft and leading to a respective one of the rear wheels.

The wheel is caused to bank (FIG. 3) from a vertical position by effort exerted by the power cylinder 58 (FIG. 1) which, acting through the stabilizing ink 66 causes crank arms 74 to turn thus, rotating the shaft 98 which is journaled on spaced sleeve bearings 100 and 102 mounted on fixed bushings 104 and 106 respectively. The shaft 98 is secured to U-joint 82 so that as the shaft 98 turns so does the attached U-joint in the arm 84 and wheel 32. Because the two rear wheels 30, 32 are connected together by the stabilizing link 66 they bank in unison and to the same degree. As banking of the wheels occurs, as shown in FIG. 3, drive shafts 118, 120 between differential 24 and the wheels are caused to elongate; for this purpose, there is a sliding or telescoping action which is permitted between the outer sleeve 124 and inner tubular member 126 which are pivotally connected at 128 and 130 respectively to the differential 24 and axles 86 of wheels 30 and 32 respectively. The two parts 124, 126 are splined together to form a driving connection while permitting the sliding action.

The degree of banking of the wheels 30, 32, (FIG. 1) is in direct proportion to the degree of steering. Thus, when the wheel 36 is steered a slight amount and the front wheels 18 and 20 are turned for example 3 degrees or more, the amount of banking of the wheels is established proportionately thereto, since the amount of bank is regulated through the power cylinder 58 which is connected to the stabilizing link 66. But when considerable degree of turning of the front wheels 18 and 20 is effected then there will be proportionately communicated through the power cylinder 58 a greater degree of banking of the wheels 30, 32 so that there is always proportionate to the amount of steering, the correct degree of banking of the rear wheels and thus, the vehicle has at all times a high degree of stability as it passes through a curvature from turning or steering of the vehicle wheels.

This should be contrasted with the previous non-banking of the wheels in conventional suspension systems.

For example, referring to FIGS. 6, 7 and 8 with an independent suspension system as shown in FIG. 6, assuming that the vehicle is coming out of the plane of the paper, and is turning left with respect to the viewer, the vehicle body 200 supported on wheels 202, 204 and when so steered will cause the vehicle wheels 202, 204 to bank in such a direction that the upper part of the wheels are inclined to the right, because the center of gravity of the vehicle body is directed along the line indicated by the line 206, this being the result of the centrifugal force indicated by line 208 and the gravity force indicated by line 210.

When the body 200 is supported on the beam axle as indicated in FIG. 7, the wheels remain upright but the resultant force line indicated by referent 209 intersects the ground at point B which is still sufficiently adjacent the outboard wheel 202, to produce an unstable condition of turning. Thus, while the point of intersection with the ground is moved inboard slightly from the point A indicated in FIG. 6, it is still insufficient to produce a stable condition of turning. Both of these conditions as indicated in FIG. 6 and 7 should now be compared with the force system of FIG. 8 which embodies the present invention wherein the two wheels 202, 204 instead of tipping in the wrong direction as indicated in FIG. 6, or remaining upright as indicated in FIG. 7, are tipped or banked inwardly toward the center of turning thus contributing to the stability of the vehicle and also, since the frame 200 is turned slightly in the direction of the arrow 212, the resultant indicated by line 214 intersects the ground at point C which is displaced from the outboard wheel 202 by an amount contributing to the stability of the vehicle. Ideally, the point of intersection of the resultant with the ground should be as close as possible to the mid-portion of the body of the vehicle for maximum stability and the location of the point C as compared with the location of the point A and B in FIGS. 6 and 7 is substantially displaced toward the center line of the vehicle also contributing to the stability of the vehicle during turning.

As a result of both factors i.e., bank of the wheels and location of the resultant, it is possible to maintain the vehicle under better control during turning and avoiding dangerous skidding and swerving at a given speed and for given road conditions.

Referring next to the embodiment of FIG. 5, the invention is equally adaptable for rear mounted engines as indicated in the drawing. In this case, engine 310 having transmission 311 is mounted at the rear of chassis 312 on the frame members 314, 316 which are reinforced by a cross beam 318. The rear wheels (one of which is shown removed in FIG. 5) are mounted on U-joints 320, 322, which pivotally support the wheels one of which is indicated by reference numeral 324. The wheels are mounted on axles 326, 328 which are received on mounting arms 327, 329 which permit free vertical movement of the wheels about the pivot mounting for the linkage arm 327 or the U-joint 320. The pivoting is provided by suitable pin or the like 330. The wheels are free to rotate on axles 326 and 328 are driven by drive shafts 340 which are connected to the engine through a differential 350 operatively connected to an engine 310. The vertical movement of the wheels is yieldably resisted by springs 360, 362 which are compressed between upright arms 370, 372 which are integrally constructed with arms 327, 329. The springs 360, 362 are compressed between the ends of the respective arms 370, 372 and the upright ends 390, 392 of arms 393, 395 which are pivotally mounted in the chassis through welded connections 396, 398 with shafts 420, 422. The arms 393, 395 are linked together through a stabilizing bar 400 which is caused to move back and forth as indicated by the double arrow headed line 402 by a power cylinder 404, which is mounted through a hinge 406 to a crossbeam 318. The power cylinder has a piston rod 410, swivably connected at 412 to the midportion of stabilizing bar 400. The power cylinder 404 depending upon the direction of actuation is able to move the stabilizing bar 400, in either of the directions indicated by line 402 to cause the arms 393, 395 to pivot in one direction or the other. The arms 393, 395 which are connected with shafts 420, 422 turn them angularly in one or the other of the directions indicated by double arrow headed line 418. The shafts 420 and 422 are journaled at their opposite ends in journal blocks 430, 432 and each is connected to a respective one of the U-joints 320, 322 to bank the wheels mounted one at each side of the chassis 312. When the wheels are banked, the drive shafts 340 can elongate as in the previous embodiment and the degree of elongation is dependent upon the degree of angular banking of the wheels.

The power cylinder 404, is operatively connected with the power steering system so that the amount of bank is related to the degree of steering. Thus, for steering at substantial angles the tires are sharply banked, and for less degrees of steering the tires are more shallowly banked, but the degree of bank is always related to the degree of steering and both wheels are jointly banked being interconnected by the stabilizing bar 400.

In each of the foregoing embodiments, the wheels are independently suspended so that one or the other may be moved vertically about its pivot connection in a vertical plane relatively to the frame. This contributes to stability and comfort in the ride of the vehicle since all wheels are not subject to the same degree of road shock and for maximum comfort and stability in the ride of the vehicle each wheel should be separately responsive to the road shock conditions which it receives and such road shock should be separately and independently cushioned at the respective wheel. In the present invention each of the wheels which is mounted for banking movement, is separately and independently supported and cushioned against road shock by a respective one of the spring for that purpose and yet each rear wheel while being separately and independently suspended is nevertheless joined together in the degree of bank since during steering both will be subjected to approximately the same degree of ground reaction from the inertia of the vehicle. It would not be a stable condition to differentially bank the wheels and therefore each of the rear wheels is identically banked but independently angularly movable in a vertical plane relatively to the chassis of the vehicle.

It is this unique combination of separate and independent vertical mounting but coacting bank which contributes to the superior ride and comfort for the vehicle and yet imparts a greater stability to the vehicle in turning because of a banking action which is directly related to the degree of steering.

It should further be noted that as the vehicle wheels bank and move pivotally, the chassis remains in substantially the same planar position so that the attitude of the passengers is substantially unchanged during the respective banking and pivotal movements of the wheel.

OPERATION OF THE INVENTION

In operation, as the vehicle 10 is moved and steered, each of the rear wheels 30, 32 is banked (FIGS. 1, 3) depending upon the direction of the turning of the front wheels 18, 20. At the same time, referring to FIG. 2 each of the rear wheels 30, 32 is separately and independently movable in a vertical plane relatively to the chassis about pivot pin 80. There is therefore, independent vertical suspension at the rear wheels of the vehicle but a coordinated banking of the wheels (FIG. 3).

The purpose of banking the wheels (FIG. 3) is to maintain the center of gravity of the vehicle located as centrally as possible of the vehicle and also, to secure a stable condition of the wheels against skid by inertia as the vehicle changes its direction. Banking of the wheels is substantially equivalent of banking the turn itself or banking the roadway, since roadways are not always properly banked at all, the vehicle can turn more easily at a given speed and with a greater degree of stability and controllability by reason of the banking of the wheels 30, 32.

Banking of the wheels 30, 32 is achieved by means of the power cylinder 58 (FIG. 1) which is connected through fluid lines to the hydraulic valve 40 which in turn is operated by steering wheels 36 so that, depending upon the degree of turning of the wheel 36, the power cylinder 58 will be operated to produce a shifting of stabilizer 66 (FIGS. 1, 2) in one direction or the other as indicated by reference numeral 67. As the linkage 66 is moved it causes turning of the crank arms 72, 74 which are connected with shafts 98 turning such pivot shafts 98 in one angular direction or the other on the sleeve bearings 100, 102 (FIG. 2). The shafts 98 turn the U-joint 82, which vertically mounts the wheels on the chassis of the automobile thus causing banking of both wheels 30, 32 in one direction or the other (FIG. 3). Even though the two wheels 30, 32 are connected by means of the stabilizer 66 (FIG. 1) each wheel 30, 32 can independently move vertically as indicated in FIG. 2 on its respective pivot pin 80 against the resistance of its coacting spring 90.

The wheel is mounted on arm 84 through axle 86 and the vertical movement indicated in FIG. 2 is either upward or downward depending road conditions, and the angular movement of arm 84 and transverse arm 88 is totally independent of the other wheel at the opposite side of the chassis of the vehicle. Thus, each of the baked wheels, while separately and independently vertically suspended, is connected to the other wheel for a coordinated banking action. As a result, FIG. 8 during banking, the bank is developed toward the center of turning and the center of gravity of the chassis is shifted toward the mid-point between the wheels thus contributing to the stability in steerability of the vehicle.

SUMMARY OF THE INVENTION

My invention combines the advantages of independent suspension and the wheels can turn or tilt relatively to the chassis to develop a correct bank. It has thus been possible to provide a combination of a good ride and good cornering qualities thus combining the advantages of a straight or beam-axle cornering with smoothness obtained with independent suspension. These advantages although being in prior designs were difficult to combine but I have combined both features in the present invention.

The resilient elements in support of the wheels is obtainable by means of a spring which is located in relation to an upright arm of a pair of transverse arm mountings for the wheel thus allowing more room for the engine, transmission and differential.

In the embodiments I have shown a power cylinder for banking the wheels. But this is only one means by which I can power the wheels into banked positions. I can achieve the same results in other suitable manners as for example, with an electric motor, an inertial device, by pneumatic pressure or a combination of the foregoing. I do not limit the invention to the particular means selected.

Although the present invention has been illustrated and described in connection with two example embodiments, it will be understood that these are illustrative of the invention and are by no means restrictive thereof. It is reasonably to be expected that those skilled in this art can make numerous revisions and adaptations will be included within the scope of the following claims as equivalents of the invention.

What is claimed is:

1. A suspension apparatus for vehicles comprising a vehicle frame, support linkage means having a pivoted connection with said frame and adapted to receive a vehicle wheel to provide movement thereof in a vertical plane relatively to said frame, means for journaling said support linkage on said frame whereby the linkage and attached wheel can turn angularly to provide banking movement of said wheel in combination with vertical pivotal movement of said support linkage, means for effecting turning of said linkage on said journaling means and comprised of a power cylinder having a fluid connection with the steering system of said vehicle whereby the steering of the vehicle and banking of the wheel are coordinated together while concurrently providing vertical cushioning movement.

2. In a vehicle suspension system for a vehicle, said vehicle having a frame and at least a wheel in ground engagement, means for driving said wheel and including an elongatable drive shaft and a U-joint operatively connected to said wheel, means pivotally mounting said wheel for compound movements about longitudinal and lateral axes on said frame to provide for vertical and angular wheel movement about said axes, resilient means incorporated within said mounting means to be unopposed to angular wheel movement and yieldably opposing pivoting of said wheel in a vertical plane to provide for cushioning between the ground and vehicle through said wheel and for applying a restoring force on said wheel when the forces producing pivoting are relieved, means for journalling said pivotally mounting means to provide for angular banking movement of said wheel in a transverse vertical plane whereby the wheel is disposed at an angular banked position for stabilized vehicle turning, and means forming a support connection between said wheel mounting means and said frame.

3. The vehicle suspension system according to claim 2 wherein said resilient means is disposed at a vertical level above said pivotally mounting means and carried by said pivotally mounting means to the same angular displacements as said wheel whereby such angular banking movements are substantially unopposed by said resilient means.

4. The vehicle suspension system in accordance with claim 2 wherein said vehicle is provided with a pair of positively driven rear wheels and wherein two said suspension systems are provided one in combination with each of said positively driven vehicle rear wheels.

5. The vehicle suspension system in accordance with claim 2 including power actuating means for effecting banking of said wheel, and means combined with the steering system of the vehicle to effect steering and banking in proportional amounts.

6. The vehicle suspension system in accordance with claim 2 including a plurality of driven wheels and a pair of said suspension systems one for each of said driven wheels, and knuckle mounting means for receiving said wheels.

7. The suspension system apparatus in accordance with claim 2 wherein said vehicle includes a plurality of wheels and means for effecting turning of said wheels and comprised of a power cylinder having a fluid connection with the steering system of said vehicle and to effect simultaneous steering and banking of said wheels in coordinated movements.

8. In a vehicle suspension system for a vehicle having a frame and vehicle wheels in ground engagement, means for driving said wheel, means pivotally mounting said wheel for compound movements about longitudinal and lateral axes on said frame to provide for vertical and angular wheel movements about said axes, resilient means incorporated within said mounting means to be unopposed to angular wheel movement and yieldably opposing pivoting of said wheel in a vertical plane to provide for cushioning between the ground and vehicle through said wheel and for applying a restoring force on said wheel when the forces producing pivoting are relieved, means for journalling said pivotally mounting means to provide for angular banking movement of said wheel in a transverse vertical plane whereby the wheels are disposed at an angular banked position for stabilized vehicle turning, and means forming a support connection between said wheel mounting means and same frame.

* * * * *